United States Patent [19]

Hackney

[11] Patent Number: 4,543,024
[45] Date of Patent: Sep. 24, 1985

[54] COMBINED WASHER AND COTTER PIN ANTI-SNAG DEVICE

[76] Inventor: John Hackney, 1026 NW. 16th St., Stuart, Fla. 33494

[21] Appl. No.: 597,492

[22] Filed: Apr. 6, 1984

[51] Int. Cl.⁴ ............................................. F16B 21/01
[52] U.S. Cl. ..................................... 411/364; 411/513
[58] Field of Search ................ 411/358, 359, 362–365, 411/513–515, 530, 531, 533, 908, 945

[56] References Cited

U.S. PATENT DOCUMENTS 1,911,990  5/1933  Cooke ................................. 411/364
2,345,141  3/1944  McMullen ........................... 411/513

FOREIGN PATENT DOCUMENTS 317445  4/1930  United Kingdom ................ 411/513

Primary Examiner—Gary L. Smith
Assistant Examiner—Neill Wilson
Attorney, Agent, or Firm—Carroll F. Palmer

[57] ABSTRACT

A combined washer and cotter pin anti-snag device comprises a base portion, a raised portion integral with the base portion, a transverse hole in the raised portion through which a fastener is adapted to extend, and a longitudinal hole in the raised portion above the base portion through which a cotter pin is adapted to extend so that the legs of the cotter pin may be passed through the fastener and then be spread apart above the base portion.

6 Claims, 9 Drawing Figures

COMBINED WASHER AND COTTER PIN ANTI-SNAG DEVICE

BACKGROUND OF THE INVENTION

1. Field of the Invention

The invention relates broadly to devices for use with cotter pins. More particularly it concerns the combination of a washer and a device for preventing the spread legs of a cotter pin from snagging clothing, flesh or other items.

2. Description of the Prior Art

A major use of cotter pins is to help retain clevis pins or like fasteners in position in some structure in which they are used for holding or fastening purposes. Usually a washer will be inserted over the end of the clevis pin and then a cotter pin is inserted through the end hole of a clevis pin. Then it is conventional to spread apart the legs of the cotter pin so that it can not be dislodged from the clevis pin. The spread legs of cotter pins used in this manner present a constant hazard because of their propensity to snag clothing, fingers or other body flesh, cord or ropes and other items.

Various forms of washers for use with cotter pins have been developed some of which provide a combination of functions. For example, it is known to combine a washer with another element that serves to spread apart the legs of a cotter pin when this is inserted through the end hole of a clevis pin, bolt or the like as disclosed in U.S. Pat. Nos. 750,501; 1,751,013; 1,911,990 and 2,345,141. The present invention provides yet another type of washer combination for use with cotter pins.

OBJECTS

A principal object of the present invention is the provision of new improvements in cotter pin devices.

Further objects include the provision of:

1. Devices to prevent cotter pin legs from snagging clothing, flesh or other items.
2. New devices that serve as a combination washer and cotter pin anti-snag member.
3. Such devices that may also serve to automatically spread the legs of a cotter pin as it is installed in a clevis pin, bolt or like fastener.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The aforesaid objects are accomplished according to the invention by the provision of a combined washer and cotter pin anti-snag device that comprises a base portion having an approximately rectangular section and an integral approximately trapezodial section, a raised portion integral with the base portion which has a V-shaped section substantially conterminous with the outer edges of the trapezodial section, a U-shaped section substantially conterminous with part of the outer edges of the rectangular section, a central section integrally joined at one side to the V-shaped section and at the opposite side to the U-shaped section.

There is a transverse hole in the central section through which a clevis pin, bolt or like fastener is adapted to extend, and a longitudinal hole in the central section above the base portion through which a cotter pin is adapted to extend so that the legs of the cotter pin may be spread apart against the inside surfaces of the V-shaped section.

In one embodiment of the invention, the new devices have a triangular lug extending laterally from the trapezodial section to serve as means to automatically spread the legs of a cotter pin extended through the longitudinal hole.

BRIEF DESCRIPTION OF THE DRAWINGS

A more complete understanding of the invention may be had by reference to the accompanying drawings in which:

FIG. 8 is a sectional view taken on the line VIII—VIII of FIG. 3.

DESCRIPTION OF PREFERRED EMBODIMENTS

Figure 1:
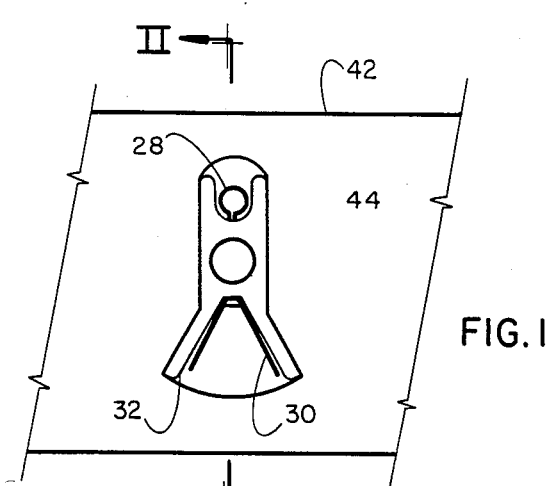
FIG. 1 is a lateral view of a structure comprising a device of the invention positioned together with a clevis pin and a cotter pin.

With reference in detail to the drawings, the combined washer and cotter pin anti-snag device 2 comprises a base portion 4 having an approximately rectangular section 6 and an integral approximately trapezodial section 8. A raised portion 10, that is integral with the base portion 4, has a V-shaped section 12 substantially conterminous with the outer edges 14 of the trapezoidal section 8 and a U-shaped section 16 substantially conterminous with part of the outer edges 18 of the rectangular section 6. A central section 20 is integrally joined at one side to the V-shaped section 12 and at the opposite side to the U-shaped section 16.

There is a transverse hole 22 in the central section 20 through which a clevis pin 24, bolt (not shown) or the like is adapted to extend. A longitudinal hole 26 in the central section 20 above the base portion 4 through which a cotter pin 28 extends so that the legs 30 of the cotter pin 28 may be spread apart against the inside surfaces 32 of the V-shaped section 12.

Figure 9:
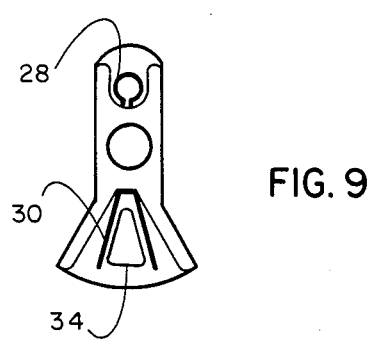
FIG. 9 is a plan view of another embodiment of the new devices of the invention.
Figure 7:
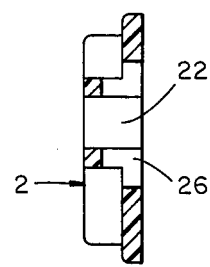
FIG. 7 is a sectional view taken on the line VII—VII of FIG. 3.

In the embodiment shown in FIG. 9, the new devices 2 have a triangular lug 34 extending laterally from the trapezoidal section 8 to serve as means to automatically spread the legs 30 of a cotter pin 28 extended through the longitudinal hole 26.

Figure 2:
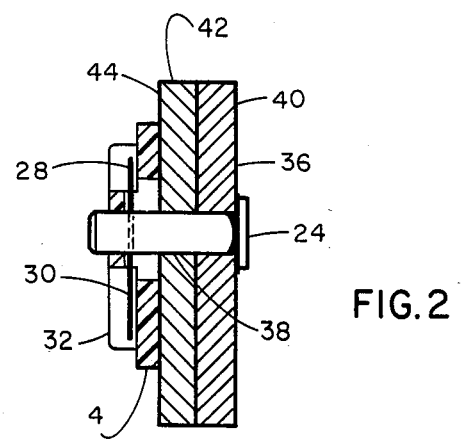
FIG. 2 is a sectional view taken on the line II—II of FIG. 1.
Figure 3:
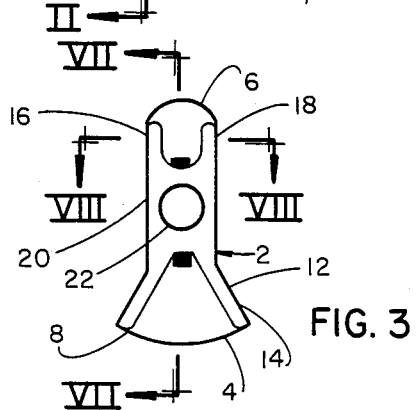
FIG. 3 is a plan view of a device of the invention.
Figure 4:
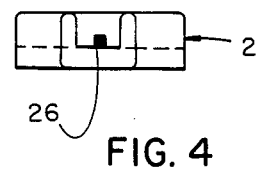
FIG. 4 is a end view of the device of FIG. 3.
Figure 5:
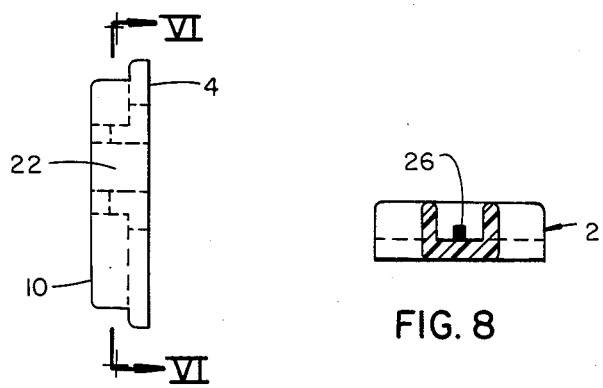
FIG. 5 is a side view of the device of FIG. 3.
Figure 6:
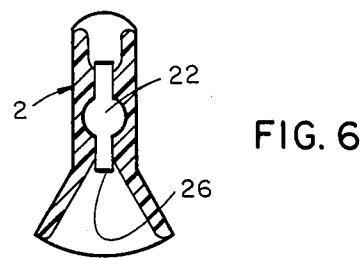
FIG. 6 is a sectional view taken on the line VI—VI of FIG. 5.

Use of the new devices 2 of the invention is illustrated in FIGS. 1 and 2. Thus, the clevis pin 24 extends through holes 36 and 38 in the metal strips 40 and 42 to hold them together. The cotter pin 28 retains the clevis pin 24 in its holding position and the base 4 of the device 2 serves as a washer between the outer surface 44 of strip 42 and the cotter pin 28. In addition, the section 8 of the device 2 shields the legs 30 of the cotter pin 28 to prevent the legs 30 from snagging lines, flesh or the like that could otherwise contact the cotter legs 30 if it were not for the protection against this by the device 2.

The embodiments of the invention in which an exclusive property or privilege is claimed are defined as follows:

1. A combined washer and cotter pin anti-snag device comprising:
   a base portion having an approximately rectangular section and an integral approximately trapezodial section,
   a raised portion integral with said base portion which has:
   a V-shaped section substantially conterminous with the outer edges of said trapezodial section,
   a U-shaped section substantially conterminous with part of the outer edges of said rectangular section,
   a central section integrally joined at one side to said V-shaped section and at the opposite side to said U-shaped section,
   a transverse hole in said central section through which a fastener is adapted to extend, and
   a longitudinal hole in said central section above said base portion through which a cotter pin is adapted to extend so that the legs of said cotter pin may be spread apart against the inside surfaces of said V-shaped section.

2. The device of claim 1 that has a triangular lug extending laterally from said trapezodial section to serve as means to spread the legs of a cotter pin extended through said longitudinal hole.

3. The device of claim 1 wherein the free end of said rectangular section is arcuate.

4. The device of claim 1 wherein the free end of said trapezodial section is arcuate.

5. The device of claim 4 wherein the free end of said rectangular section is arcuate.

6. The device of claim 1 that is made of rigid plastic material.

* * * * *